(12) United States Patent
Marques et al.

(10) Patent No.: US 10,150,156 B2
(45) Date of Patent: Dec. 11, 2018

(54) CASTING TREE AND METHOD OF ASSEMBLY

(71) Applicant: SAFRAN AIRCRAFT ENGINES, Paris (FR)

(72) Inventors: Francois Marques, Moissy-Cramayel (FR); Olivier Griset, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 199 days.

(21) Appl. No.: 15/127,286

(22) PCT Filed: Mar. 9, 2015

(86) PCT No.: PCT/FR2015/050578
§ 371 (c)(1),
(2) Date: Sep. 19, 2016

(87) PCT Pub. No.: WO2015/140448
PCT Pub. Date: Sep. 24, 2015

(65) Prior Publication Data
US 2018/0185905 A1 Jul. 5, 2018

(30) Foreign Application Priority Data
Mar. 19, 2014 (FR) .................................. 14 52292

(51) Int. Cl.
*B22C 7/02* (2006.01)
*B22C 9/04* (2006.01)
*B22C 9/24* (2006.01)
*B22C 9/22* (2006.01)
(Continued)

(52) U.S. Cl.
CPC ................ *B22C 7/026* (2013.01); *B22C 9/04* (2013.01); *B22C 9/22* (2013.01); *B22C 9/24* (2013.01);
(Continued)

(58) Field of Classification Search
CPC ........... B22C 7/02; B22C 7/023; B22C 7/026; B22C 9/04; B22C 9/043; B22C 9/046; B22C 9/24
(Continued)

(56) References Cited

U.S. PATENT DOCUMENTS 3,848,654 A 11/1974 Boyle et al.
4,081,019 A * 3/1978 Kulig ....................... B22C 7/02
164/244

(Continued)

FOREIGN PATENT DOCUMENTS

DE 197 49 592 A1 7/1999

OTHER PUBLICATIONS

International Search Report dated Jul. 9, 2015 in PCT/FR15/50578 Filed Mar. 9, 2015.

*Primary Examiner* — Kevin P Kerns
(74) *Attorney, Agent, or Firm* — Oblon, McClelland, Maier & Neustadt, L.L.P.

(57) ABSTRACT

A field of lost pattern casting, and more particularly to a casting tree for lost pattern casting, and also to its method of assembly is provided. The casting tree includes at least one part support, at least one pattern, and at least one first male-female connection connecting the pattern to the part support. The first male-female connection includes an orifice, a peg at least partially inserted inside the orifice, and a film of meltable material interposed at least between an outside surface of the peg and an inside surface of the orifice.

14 Claims, 15 Drawing Sheets

(51) Int. Cl.
*B22D 35/04* (2006.01)
*B22D 47/02* (2006.01)
B22D 25/02 (2006.01)
B29C 65/78 (2006.01)

(52) U.S. Cl.
CPC .............. *B22D 35/04* (2013.01); *B22D 47/02* (2013.01); *B22D 25/02* (2013.01); *B29C 65/7805* (2013.01)

(58) Field of Classification Search
USPC .............. 164/34, 35, 45, 235, 246, 249, 516
See application file for complete search history.

(56) References Cited

U.S. PATENT DOCUMENTS

| | | | | |
|---|---|---|---|---|
| 4,981,167 | A * | 1/1991 | Anderson | B22C 9/08 164/129 |
| 6,910,519 | B2 * | 6/2005 | Ludwig et al. | B22C 7/02 164/34 |
| 7,866,370 | B2 * | 1/2011 | Cunha | B22C 9/043 164/369 |
| 7,942,189 | B1 * | 5/2011 | Quraishi et al. | B22C 9/04 164/246 |
| 2002/0174968 | A1 | 11/2002 | Mertins | |
| 2003/0066619 | A1 | 4/2003 | Mertins | |
| 2003/0075296 | A1 | 4/2003 | Mertins | |
| 2003/0075298 | A1 | 4/2003 | Mertins | |
| 2003/0111203 | A1 | 6/2003 | Mertins | |
| 2014/0190650 | A1 * | 7/2014 | McGuire et al. | B22C 9/04 164/34 |

* cited by examiner

CASTING TREE AND METHOD OF ASSEMBLY

BACKGROUND OF THE INVENTION

The present invention relates to the field of casting, and more particularly to a casting tree for lost pattern casting, and also to methods of fabricating shell molds and to casting methods using such a pattern.

In the description below, terms such as "top", "bottom", "horizontal", and "vertical" are defined by the normal orientation of such a mold while metal is being cast into its inside.

So-called lost wax or lost pattern casting methods have been known since antiquity. They are particularly suitable for producing metal parts with shapes that are complex. Thus, lost pattern casting is used in particular for producing turbine engine blades.

In lost pattern casting, a first step normally comprises making a pattern out of a material having a melting temperature that is comparatively low, e.g. out of a wax or a resin. The pattern is then incorporated in a casting tree that is then coated in a refractory material in order to form a mold. Among the various types of mold that can be used in lost pattern casting, so-called shell molds are known in particular, which are formed by dipping the pattern or a cluster of patterns in a slip, and then dusting the slip-coated pattern or cluster with refractory sand in order to form a shell around the pattern or the cluster, followed by firing the shell in order to sinter it so as to consolidate the assembly. Several successive dipping and dusting operations may be envisaged in order to obtain a shell of thickness that is sufficient before it is fired. The term "refractory sand" is used in the present context to mean any granular material of sufficiently fine grain size for complying with the desired production tolerances, that is capable in the solid state of withstanding the temperatures of the molten metal, and that can be consolidated into a single piece while firing the shell.

After emptying or eliminating the material of the pattern from the inside of the mold, whence the "lost pattern" name of such methods, molten metal is cast into the mold so as to fill the mold cavity left inside the mold by the pattern after it has been emptied out or eliminated. Once the metal has cooled and solidified, the mold can be opened or destroyed in order to recover a metal part having the shape of the pattern. In the present context, the term "metal" covers both pure metals and also, and above all, metal alloys.

In addition to at least one pattern, the casting tree normally comprises a part support comprising a distributor that is to form at least one casting channel in the mold, that is used to deliver molten metal into the molding cavity during casting. In order to be able to produce a plurality of parts simultaneously, it is possible to incorporate a plurality of patterns as a cluster in a single casting tree.

In order to increase rates of production, it is possible to fabricate not only the patterns but also the various elements of the part support by injection molding. Nevertheless, with the increasing complexity of individual patterns and of clusters of patterns in casting trees, the ability to assemble casting trees from a plurality of separate elements is becoming simultaneously more necessary and more difficult to perform. Typically, the various elements of a casting tree are assembled together manually and adhesively bonded together. However, given the increasing complexity of the tree and the ever-tighter tolerances for positioning and alignment, in particular when performing monocrystalline casting, that leads to ever-increasing costs and time for assembly.

OBJECT AND SUMMARY OF THE INVENTION

The present invention seeks to remedy those drawbacks. In particular, this disclosure seeks to propose a casting tree for lost pattern casting that includes at least one part support, and at least one pattern, with assembly of the casting tree being simplified and easier to automate.

This object is achieved by the fact that the casting tree also comprises at least a first male-female connection connecting said pattern to the part support and comprising an orifice, a peg at least partially inserted into the inside of the orifice, and a film of meltable material interposed between an outside surface of the peg and an inside surface of the orifice. The peg may in particular be secured to the pattern and the orifice may be formed in the part support, or vice versa.

Because of the male-female connection, assembly of the casting tree can be simplified and automated, while still ensuring that the various elements are accurately positioned. Simultaneously, the film of meltable material interposed between the outside surface of the peg and the inside surface of the orifice serves to secure them to each other and to maintain this first male-female connection.

In order to ensure accuracy of the relative positioning between the peg and the orifice in this first male-female connection in at least one direction that is substantially orthogonal to an axis for inserting the peg into the orifice, the first male-female connection presents at least two points of direct contact between an outside surface of the peg and an inside surface of the orifice, which points are mutually offset in the direction that is substantially orthogonal to the insertion axis for inserting the peg into the orifice. In the present context, the term "substantially orthogonal" is used to mean an orientation close to a right angle, within the limits of fabrication tolerances and measurement. By way of example, this orientation may correspond to an angle of 90°±5°. At least one of said contact points may be formed by a protuberance that is radial relative to said insertion axis on the outside surface of the peg and/or on the inside surface of the orifice, thereby also making it possible to maintain radial spacing between the outside surface of the peg and the inside surface of the orifice, which radial spacing contains said film of meltable material.

In order to ensure accurate positioning and orientation of the pattern relative to the part support over a plurality of axes, the casting tree may further comprise a second male-female connection connecting said pattern to the part support and also comprising an orifice and a peg at least partially inserted inside the orifice with a film of meltable material interposed between an outside surface of the peg and an inside surface of the orifice, said first and second male-female connections presenting insertion axes for inserting the pegs into the respective orifices that are substantially parallel and that are offset from each other in a direction orthogonal to said insertion axes. In the present context, the term "substantially parallel" means an orientation that is parallel or nearly parallel within the limits of fabrication tolerances and measurements. This orientation may thus correspond to an angle of 0°±5°, for example. In particular, said first male-female connection may present at least two direct contact points between the outside surface of the peg and the inside surface of the orifice, which direct contact points are mutually offset in at least a first direction that is substantially orthogonal to the insertion axes for inserting the pegs into the orifices, and said second male-female connection presents at least one direct contact point between the outside surface of the peg and the outside surface of the orifice, said contact points of the second male-female connection being offset relative to said contact points of the first male-female connection at least in a second direction that is substantially orthogonal to the first direction and to the insertion axes for inserting the pegs into the orifices. Thus, with at least three contact points that are not in alignment, it is possible to obtain accurate positioning and orientation for all three axes of the pattern relative to the part support.

In order to further facilitate assembly, said first male-female connection may present at least three direct contact points between the outside surface of the peg and the inside surface of the orifice, so as to fix a position of the pattern relative to the part support, and said second male-female connection may present two direct contact points between the outside surface of the peg and the inside surface of the orifice, said two contact points of the second male-female connection being mutually offset in at least one direction that is substantially orthogonal to a plane containing said insertion axes, so as to fix the orientation of the pattern relative to the part support.

In order to block the pattern better relative to the part support, the casting tree may include another connection of the pattern to the part support opposite from the first male-female connection in the direction of an insertion axis for inserting the peg in the orifice of said first male-female connection. This other connection may be a simple adhesively bonded connection, but it could also include physical markers for ensuring the positioning and the orientation of the pattern relative to the part support.

Said part support may comprise a distributor for forming at least one casting channel in a mold, said first male-female connection connecting said pattern to said distributor. In addition, the casting tree may have a plurality of patterns connected in a cluster to the part support.

The present disclosure also provides a method of assembling a casting tree for lost pattern casting, the method comprising at least the following steps: at least partially inserting at least one peg in at least one corresponding orifice so as to create at least a first male-female connection between at least one pattern and a part support, said male-female connection presenting at least two direct contact points between the outside surface of the peg and the inside surface of the orifice, the contact points being mutually offset in the direction substantially orthogonal to the insertion axis for inserting a peg into the orifice; infiltrating a meltable material in the liquid state between at least one outside surface of said peg and an inside surface of said orifice in the first male-female connection; and solidifying the meltable material infiltrated between the outside surface of the peg and the inside surface of the orifice so as to form a film of meltable material interposed at least between an outside surface of the peg and an inside surface of the orifice in order to consolidate the first male-female connection. In particular, the infiltration step may be performed by dipping at least the first male-female connection in a bath of said meltable material in the liquid state. This "dip sealing" method enables the male-female connection to be consolidated quickly in a manner that is easy to automate.

The present disclosure also relates to a method of producing a casting mold, comprising assembling a casting tree using the above-mentioned assembly method, coating said casting tree in a refractory material in order to form the mold, and emptying the casting tree out from the inside of the mold. In particular, the casting tree may be made of a material that melts at a temperature lower than said refractory material and it can be emptied from the mold in the liquid state. In addition, the coating may be implemented by dipping said casting tree in a slip, dusting the casting tree with a refractory sand in order to form a shell around the casting tree, and sintering the shell in order to consolidate it. It is possible to envisage using a plurality of successive dipping and dusting operations in order to obtain a shell of sufficient thickness prior to sintering.

The present disclosure also provides a casting method comprising producing a casting mold using the above-mentioned production method, casting a molten metal material into the inside of said mold, solidifying the metal material in the mold, and removing the mold.

BRIEF DESCRIPTION OF THE DRAWINGS

The invention can be well understood and its advantages appear better on reading the following detailed description of embodiments given as non-limiting examples. The description refers to the accompanying drawings, in which.

DETAILED DESCRIPTION OF THE INVENTION

Figure 1:
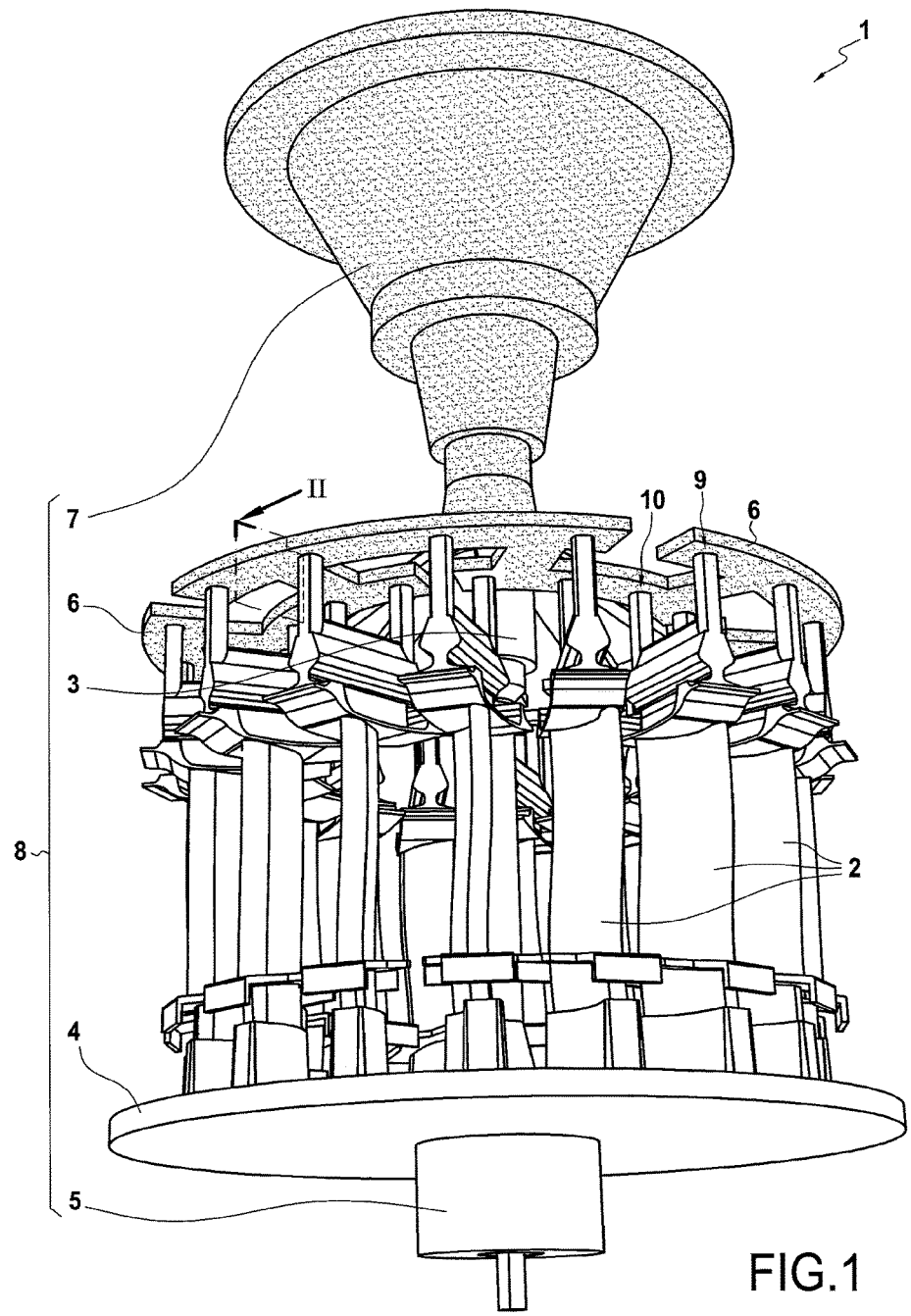
FIG. 1 is a diagrammatic perspective view of a casting tree in an embodiment.

FIG. 1 shows a casting tree 1 in an embodiment of the invention. The casting tree 1 is made of material having a comparatively low melting point, in particular a wax or a resin, and it is designed to form the internal cavities of a casting mold that is obtained by the lost wax or lost pattern method, in which the casting tree is initially coated in refractory material in order to form the mold, and then the casting tree in the liquid state is emptied out from the inside of the mold. The casting tree 1 shown thus comprises a plurality of patterns 2 arranged in a cluster around a descender 3 supported by a base 4 and a riser 5 and surmounted by a distributor 6 in the form of a ring and a cup 7. Together, the riser 5, the base 4, the descender 3, the distributor 6, and the cup 7 form a part support 8 for the patterns 2, each of which reproduces the shape of a casting that is to be produced. In the example shown, the patterns 2 thus reproduce the shape of turbine engine blades, although other applications are equally possible. The distributor 6 is for shaping casting channels in the mold to bring the molten metal to the molding cavities shaped by the patterns 2, from a funnel constituted by the cup 7.

Each of the elements of the casting tree 1 can be produced separately, e.g. by injection molding. In order to produce these elements, and in particular those of the part support 8, it is also possible to envisage using a recycled material, resulting from emptying previously-produced molds. It is nevertheless important to ensure that the elements are accurately positioned in the casting tree 1, in particular when performing difficult casting methods, such as monocrystalline casting.

Figure 2:
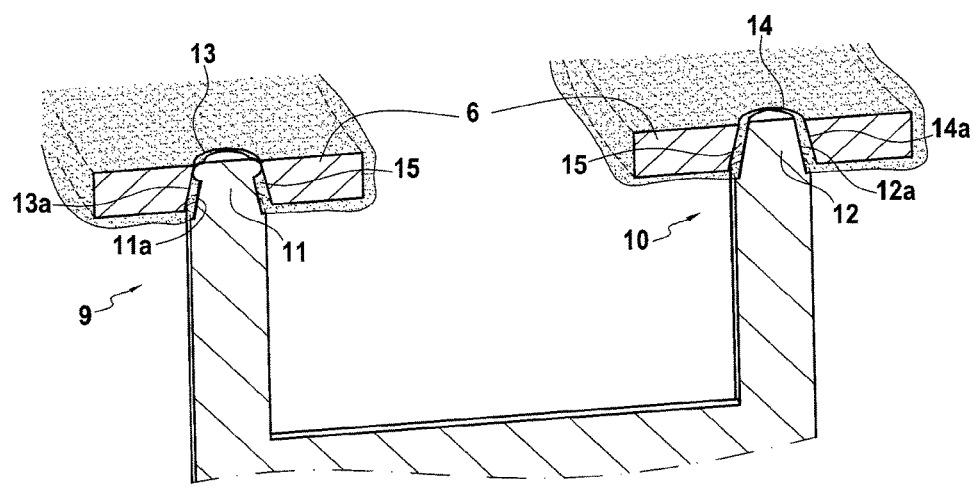
FIG. 2 is a section view of two adjacent male-female connections connecting a pattern to a distributor in the FIG. 1 casting tree.

Thus, in the casting tree 1 shown in FIG. 1, each pattern 2 is connected to the distributor 6 by a pair of male-female connections 9, 10. As shown in FIG. 2, each of these male-female connections 9, 10 comprises a peg 11, 12 and an orifice 13, 14 in which said peg 11, 12 is received. In this embodiment, in order to make the pegs 11, 12 easier to insert into the corresponding orifices 13, 14, each peg 11, 12 presents an outside surface 11a, 12a that is frustoconical and converging in the peg-insertion direction, and each orifice 13, 14 also presents an inside surface 13a, 14a that is likewise frustoconical and converging in the peg-insertion direction. Depending in particular on the options for fabricating these elements, other converging shapes, e.g. stepped shapes, could be considered as alternatives or in addition to these frustoconical shapes.

Furthermore, in each of the male-female connections 9, 10, a film 15 of meltable material is interposed between the outside surface 11a, 12a of the peg 11, 12 and the inside surface 13a, 14a of the orifice 13, 14. This film 15 that adheres both to the outside surface of the peg 11, 12 and to the inside surface of the orifice 13, 14 serves to consolidate each male-female connection 9, 10.

Figure 3:
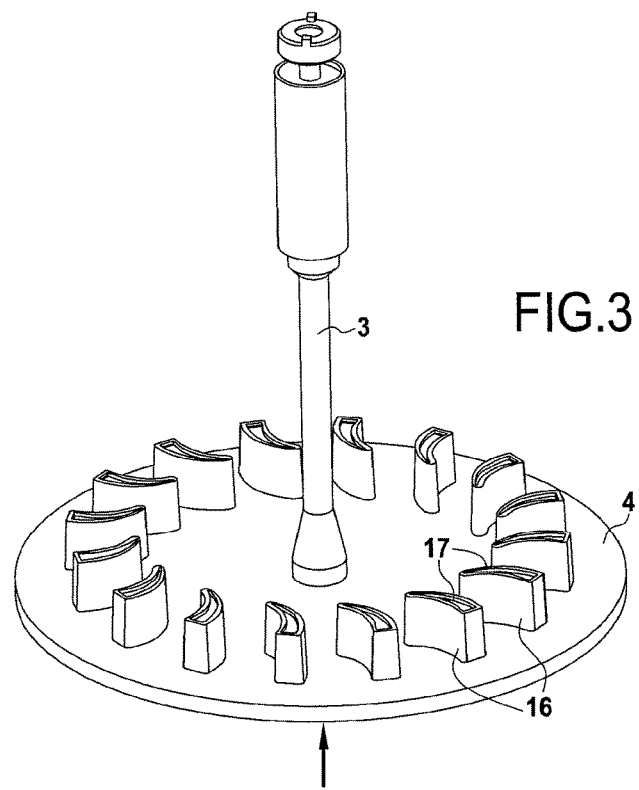
FIG. 3 is a diagram showing a first step in assembling the FIG. 1 casting tree.

FIG. 3 shows a first step in assembling the casting tree 1, in which the descender 3 is connected to the base 4. As can be seen in this figure, the base 4 includes individual raised supports 16 for each pattern 2, each of these supports 16 presenting a concave depression 17 at its top with an outline that is complementary to the outline of the bottom end of each pattern 2. Thus, the concave depression 17 is designed to facilitate properly positioning and orienting the pattern 2 in the casting tree 1.

Figure 4:
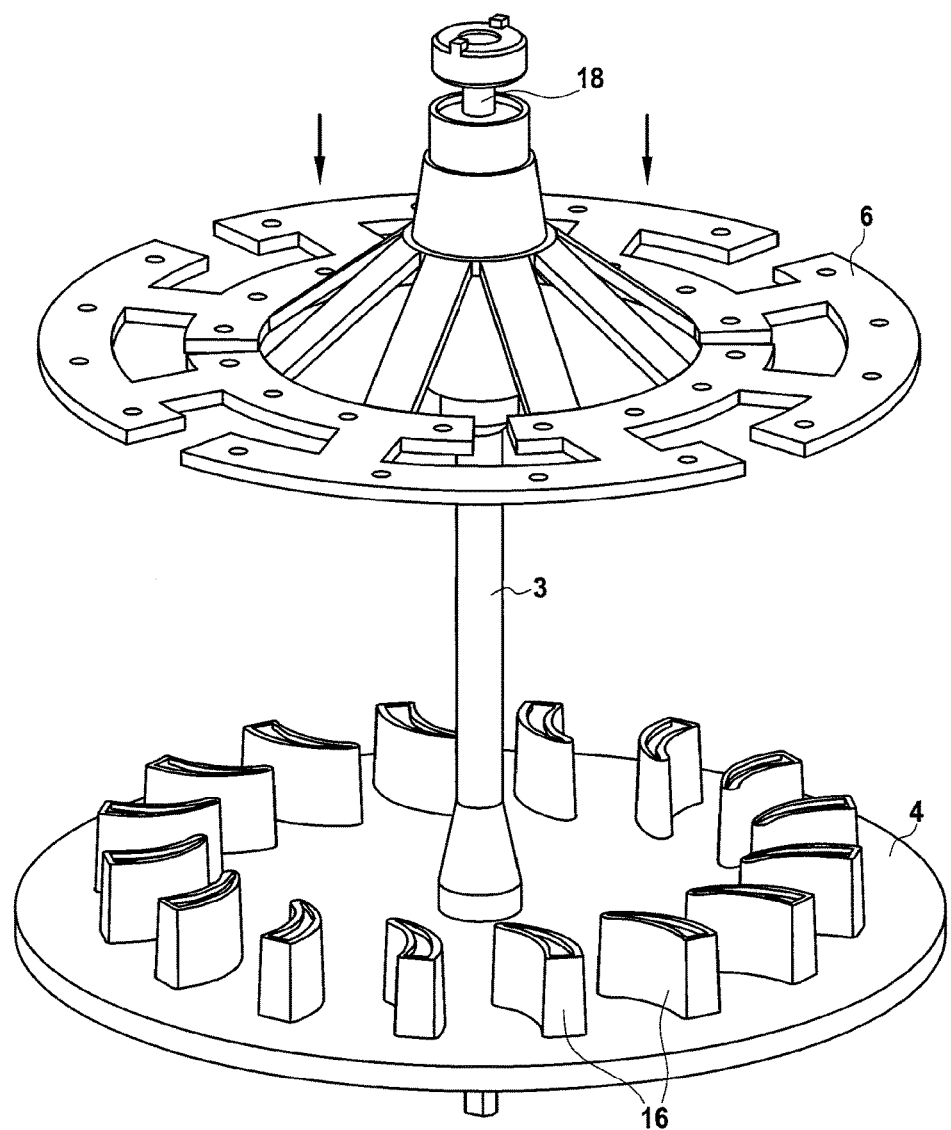
FIG. 4 is a diagrammatic perspective view showing a second step of assembling the FIG. 1 casting tree.

FIG. 4 shows a second step in assembling the casting tree 1 in which the distributor 6 is placed on the descender 3. A central rod 18 projecting vertically from the descender 3 serves to fasten the distributor 6 horizontally relative to the descender 3, while continuing to allow a certain freedom to move vertically.

Figure 5:
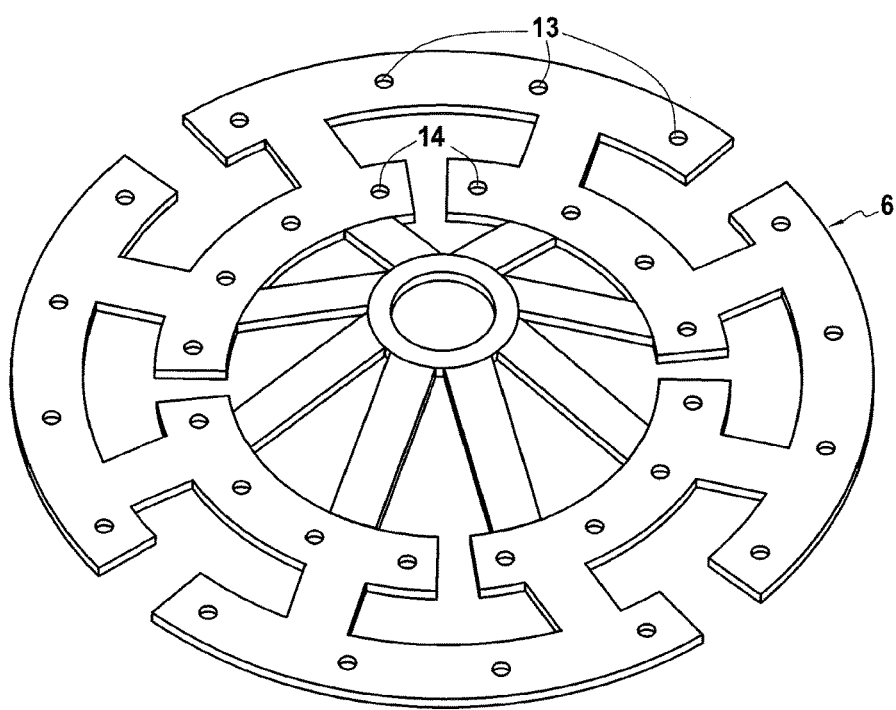
FIG. 5 shows the distributor of the FIG. 1 casting tree with orifices corresponding to said male-female connections.
Figure 6:
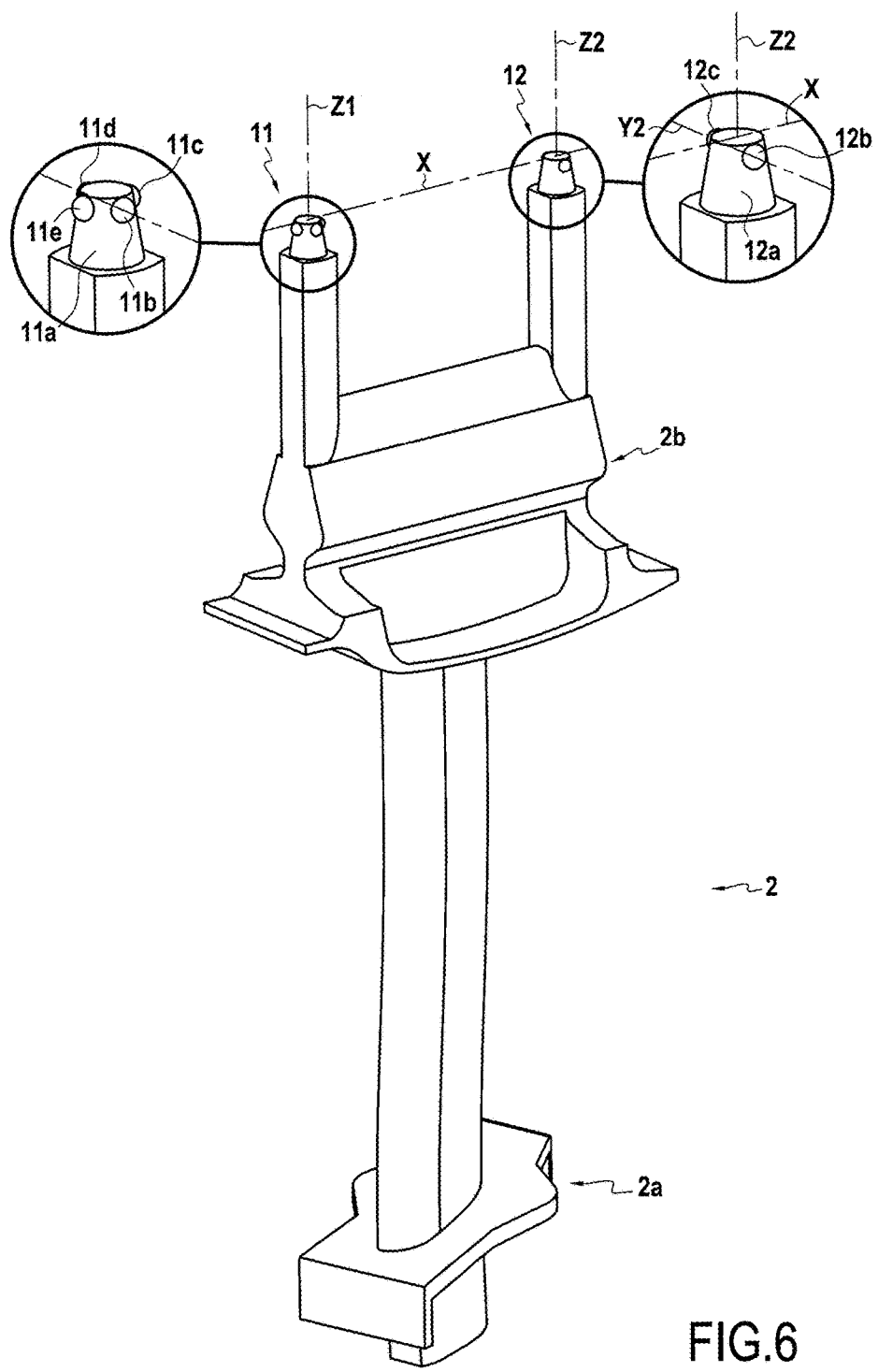
FIG. 6 is a detail view of one of the patterns incorporated in the FIG. 1 casting tree, showing in particular two pegs corresponding to said male-female connections.

As shown in FIG. 5, in this embodiment, the orifices 13, 14 of the male-female connections 9, 10 are orifices formed in the distributor 6 and passing through it vertically. Thus, the complementary pegs 11, 12 are formed on the patterns 2, as shown in FIG. 6. Nevertheless, it is equally possible to envisage inverting this arrangement either for only one of the male-female connections, or else for both of them.

As can be seen in particular in FIG. 6, in this embodiment, the patterns 2 are for producing turbine engine blades and they thus reproduce the shape of such blades. Nevertheless, it is also possible to envisage using a casting tree and an assembly method of the invention for producing other parts, and the shapes of the patterns would then be adapted accordingly. In this embodiment, each pattern 2 points downwards, thus with a bottom end 2a in the form of a blade tip, and a top end 2b in the form of a blade root, with the pegs 11, 12 being incorporated thereon and pointing along insertion axes Z1, Z2 that are substantially parallel and offset from each other along an orthogonal direction X. The outside surface 11a of the peg 11 of the first male-female connection 9 has four protuberances 11b, 11c, 11d, and 11e arranged on different axes that are radial relative to the insertion axis Z1. Each of these protuberances 11b to 11e is in the shape of a spherical cap, although it is possible to envisage other shapes as well. Furthermore, the outside surface 12a of the peg 12 of the second male-female connection 10 presents two protuberances 12b, 12c facing in opposite directions along an axis Y2 that is orthogonal to the insertion axis Z2 and to the direction X along which the two insertion axes Z1 and Z2 are offset.

Figure 7:
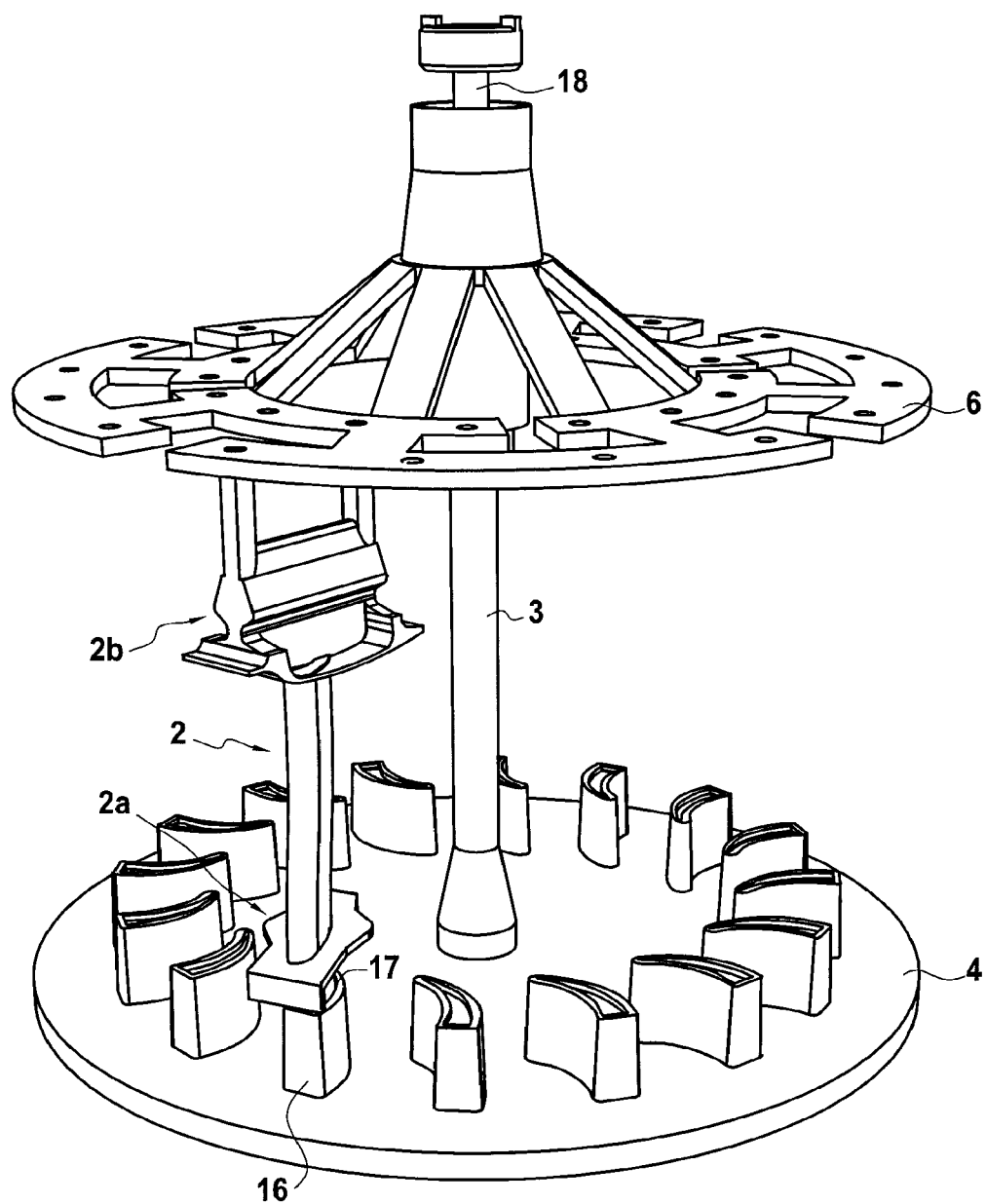
FIG. 7 is a diagrammatic perspective view showing a third step of assembling the FIG. 1 casting tree.
Figure 8:
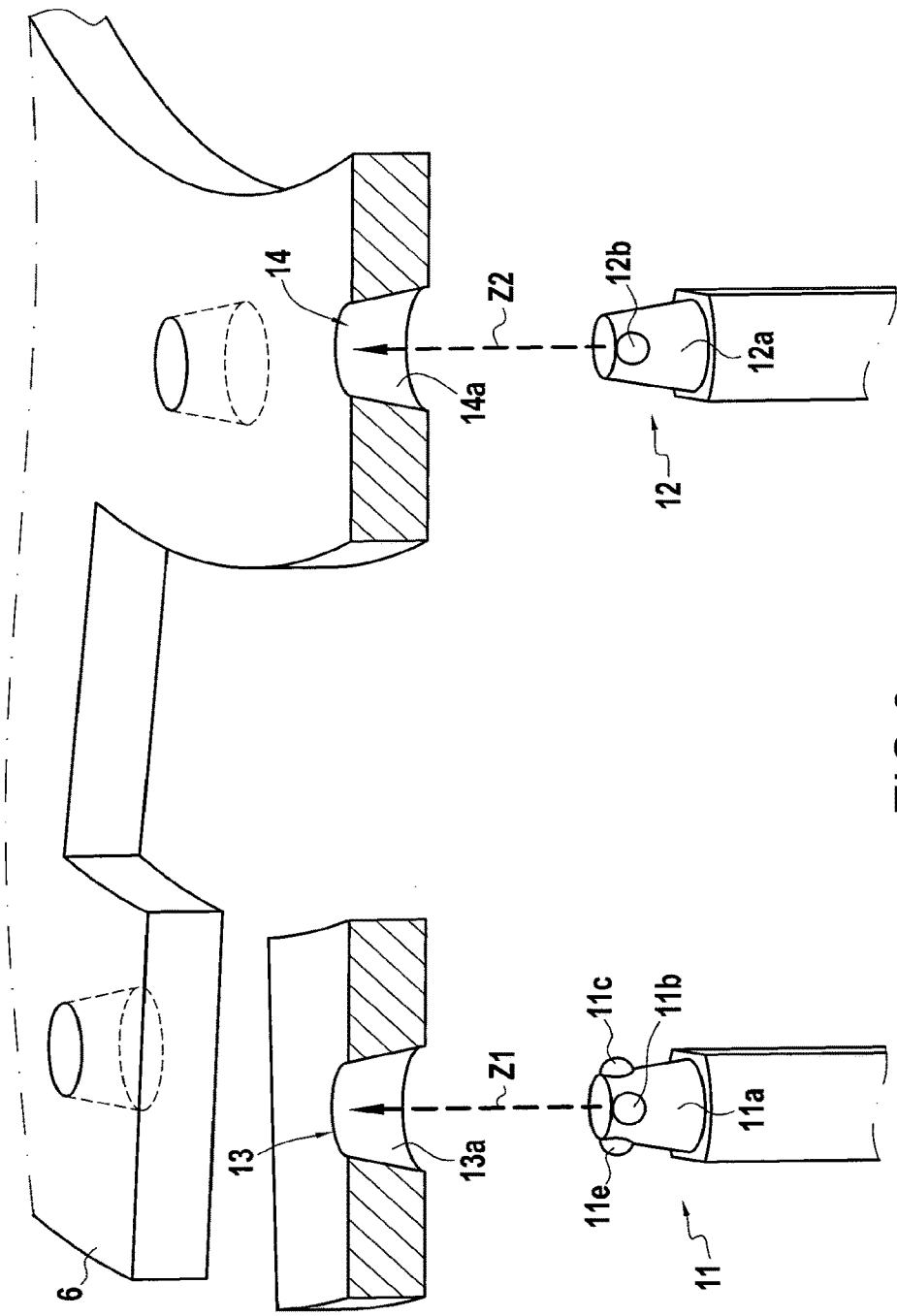
FIG. 8 shows pegs being inserted in the corresponding orifices to form said male-female connections.
Figure 9A:
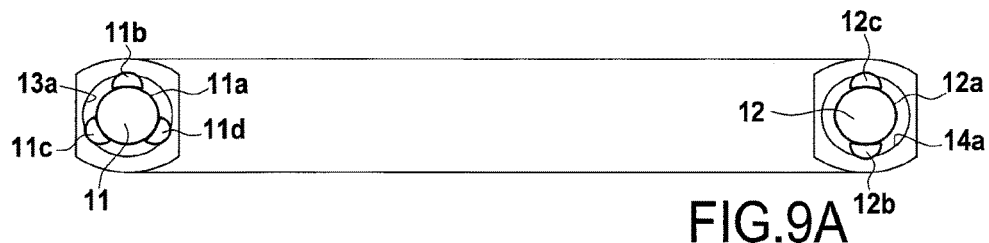
FIGS. 9A and 9B show two alternative arrangements for the male-female connections between each pattern and the part support.
Figure 9B:
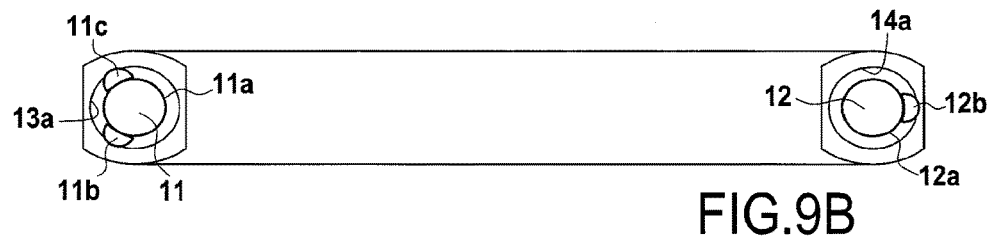

FIG. 7 is a diagram showing a first pattern 2 being put into place between the base 4 and the distributor 6. While it is being put into place, with the pattern initially slightly inclined, the pegs 11, 12 are inserted into the orifices 13, 14 along the insertion axes Z1, Z2, as shown in FIG. 8. During this insertion, the protuberances 11b, 11c, 11d, and 11e and also 12b and 12c form points of direct contact between the outside surfaces 11a, 12a of the pegs 11, 12 and the inside surfaces 13a, 14a of the orifices 13, 14 so as to maintain radial spacing elsewhere between the outside surfaces 11a, 12a of the pegs 11, 12 and the inside surfaces 13a, 14a of the orifices 13, 14 while maintaining each pattern 2 accurately in position and in orientation relative to the distributor 6. This radial spacing is in turn intended to be filled at least in part by infiltration of a meltable material in the liquid state during a subsequent step, thereby forming the film 15. Although in the embodiment shown, all of these protuberances are formed on the outside surfaces of the pegs, it is also possible as an alternative or in addition thereto, to form contact points with radial protuberances on the inside surfaces 13a, 14a of the orifices 13, 14. Furthermore, the number of protuberances may also be varied: thus, it is already possible to obtain accurate positioning for the first peg 11 with only three radial protuberances 11b, 11c, 11d, as shown in FIG. 9A, or indeed accurate positioning and orientation of the pattern 2 relative to the distributor 6 with only two radial protuberances 11b, 11c on the first peg 11 and only one radial protuberance 12b on the second peg 12, as shown in FIG. 9B, providing the points of contact are not in alignment on a plane containing the insertion axes Z1, Z2, or parallel thereto.

Figure 10:
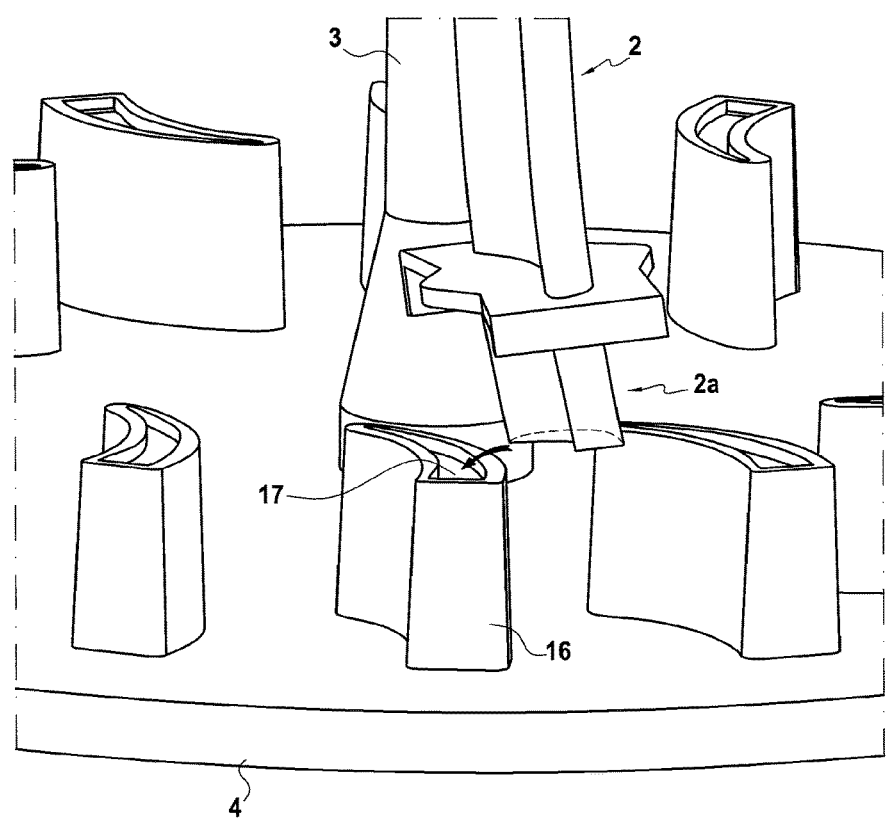
FIG. 10 shows a bottom end of the pattern being inserted in a concave depression in a base of a part support.

After the pegs 11, 12 have been inserted in the orifices 13, 14, the pattern 2 is tilted towards the vertical while being lifted a little so as to bring its bottom end 2a into alignment with the concave depression 17 on the support 16 in order to be inserted therein, as shown in FIG. 10.

Figure 11:
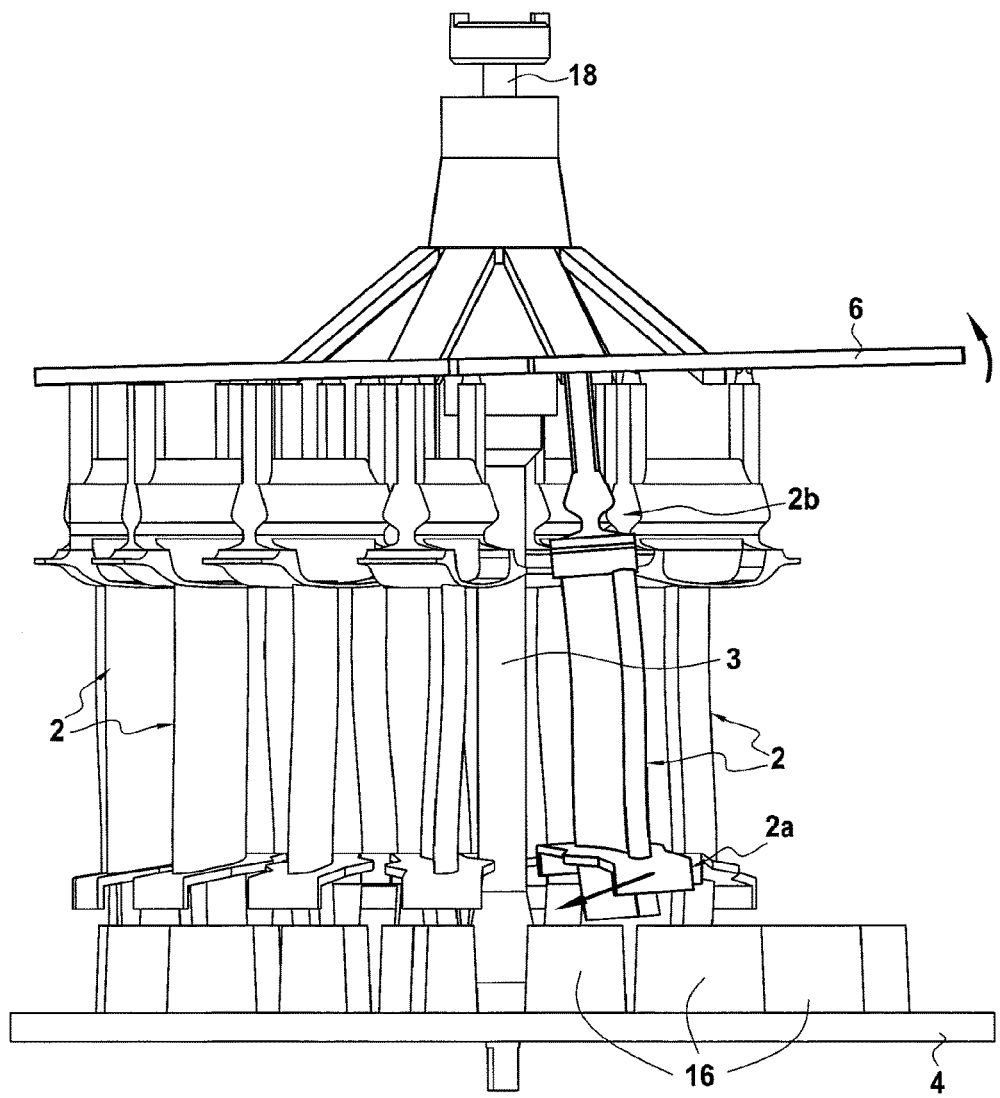
FIG. 11 is a diagrammatic perspective view showing a fourth step of assembling the FIG. 1 casting tree.

The remaining patterns 2 are subsequently inserted in succession in analogous manner between the base 4 and the distributor 6, as shown in FIG. 11. The concave depressions 17 in the supports 16 on the base 4 are substantially shallower than the pegs 11, 12 and the orifices 13, 14 in the distributor 6, so it is possible to limit the vertical movement of the distributor 6 while tilting each pattern 2 towards the vertical after its pegs 11, 12 have been inserted in the corresponding orifices 13, 14, and thus avoid the pegs 11, 12 of the patterns 2 that have already been installed escaping from the other orifices 13, 14.

Figure 13:
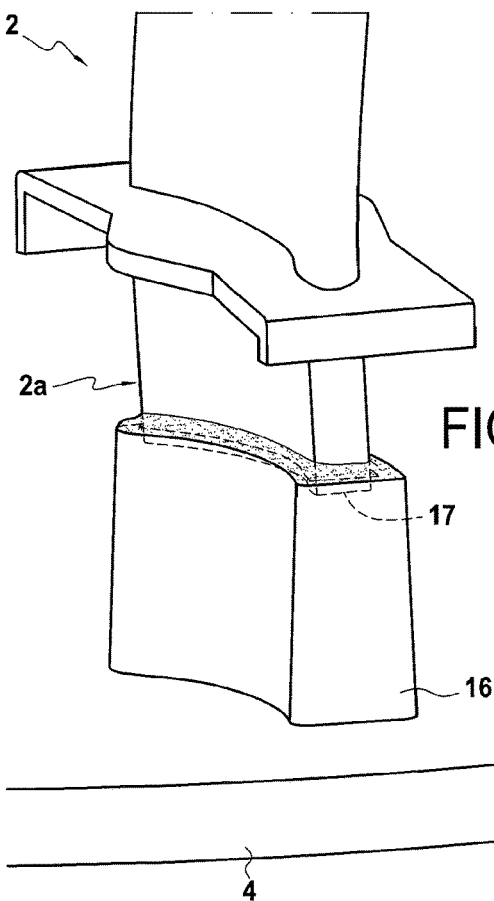
FIG. 13 is a diagram showing a sixth step of assembling the FIG. 1 casting tree.
Figure 12:
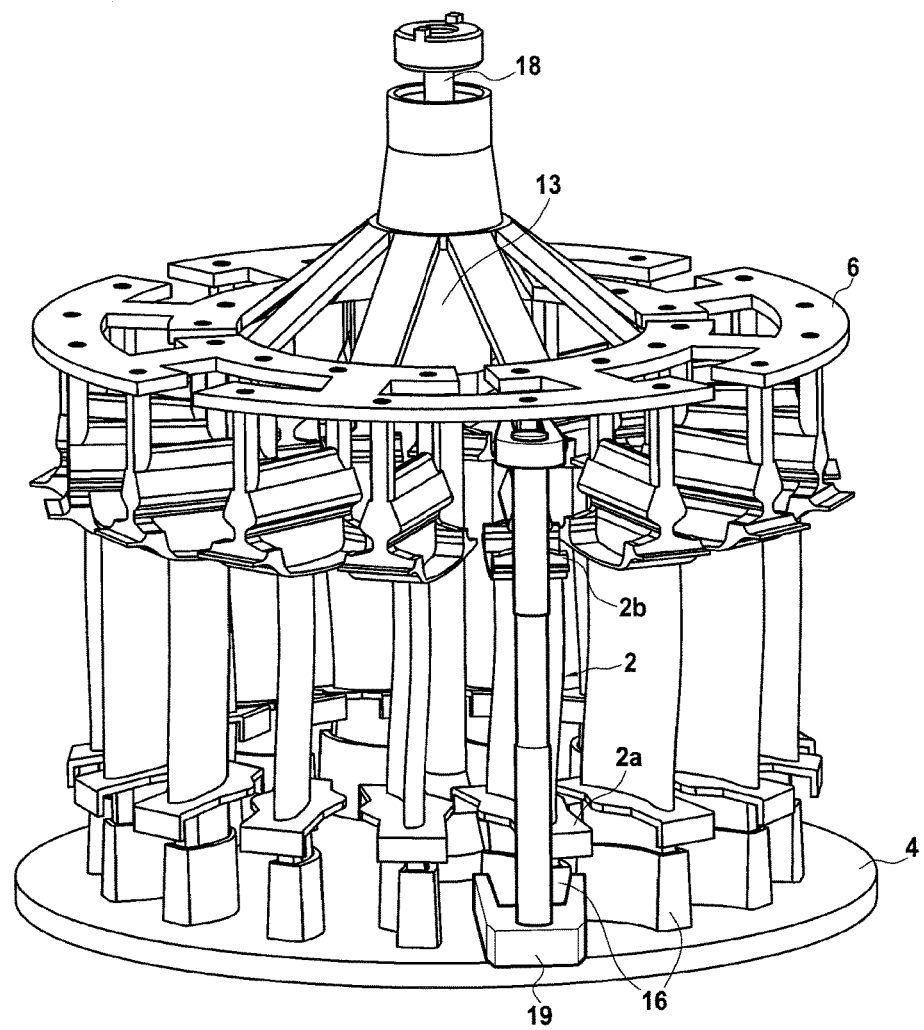
FIG. 12 is a diagram showing a fifth step of assembling the FIG. 1 casting tree.
Figure 14:
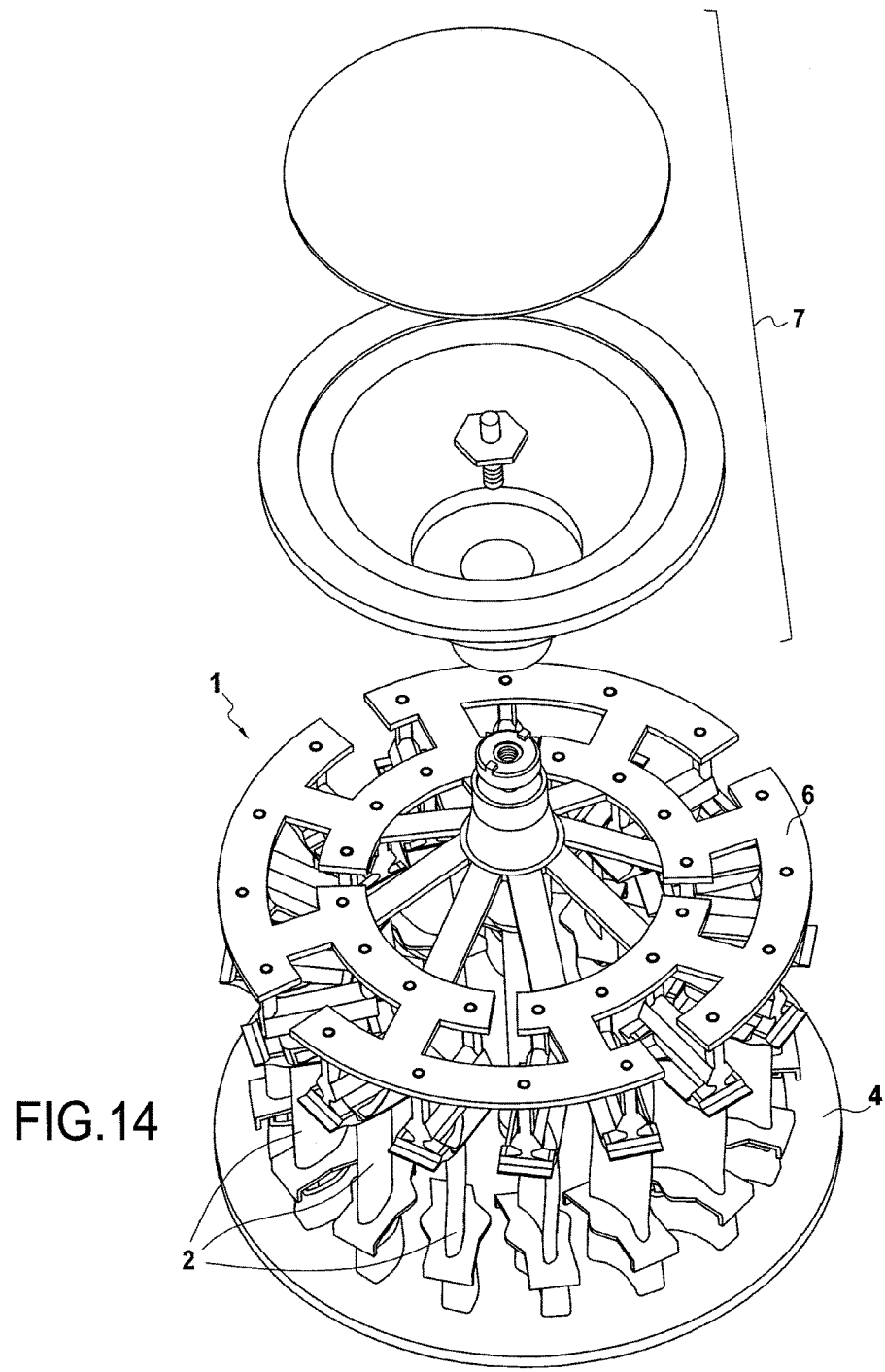
FIG. 14 is a diagrammatic perspective view showing a seventh step of assembling the FIG. 1 casting tree.
Figure 15:
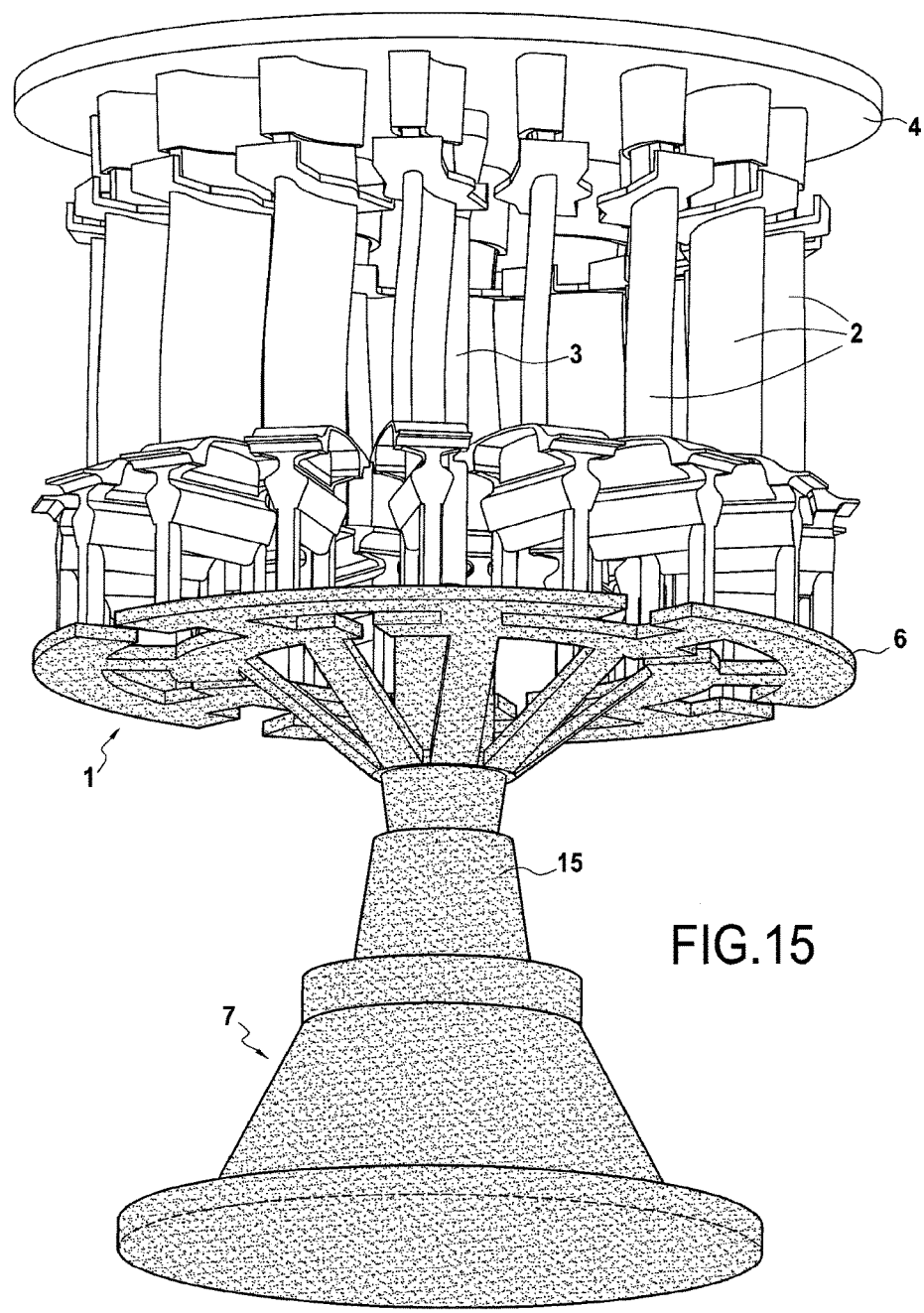
FIG. 15 is a diagrammatic perspective view showing a seventh step of assembling the FIG. 1 casting tree.
Figure 16:
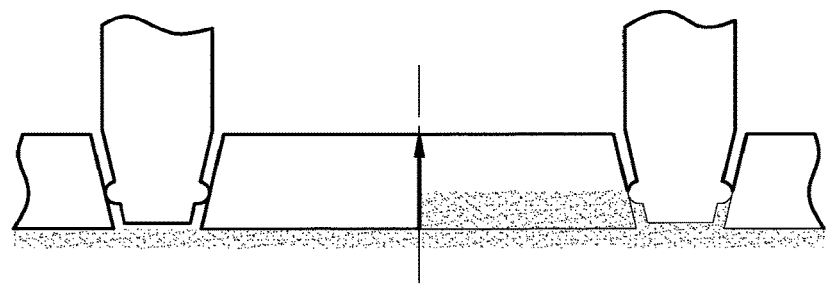
FIG. 16 is a diagram showing a liquid film infiltrating into the interstices of one of the male-female connections.
Figure 17:
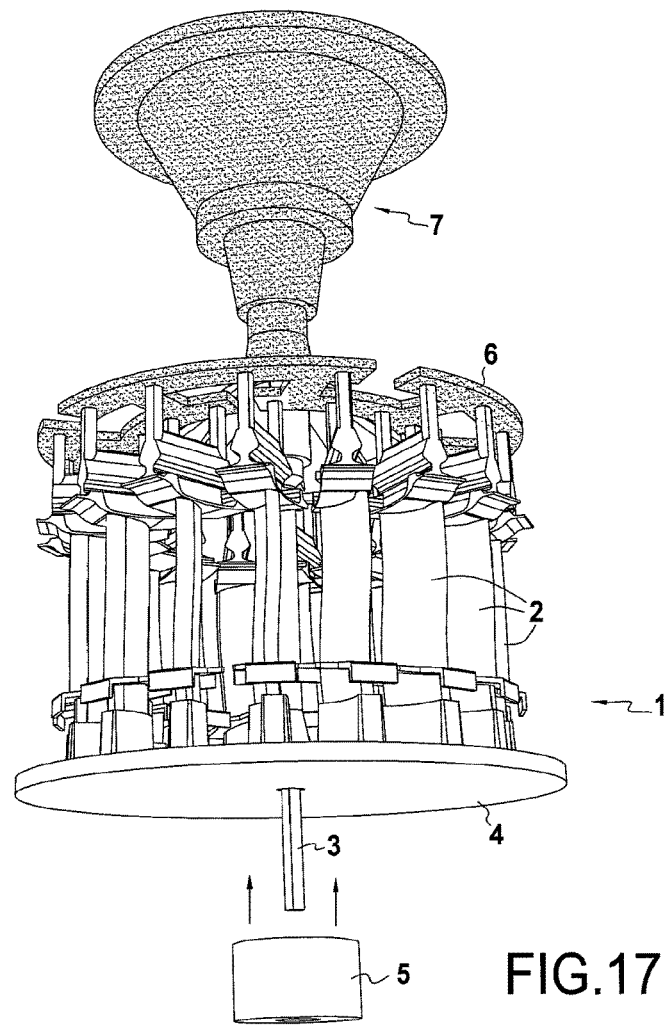
FIG. 17 is a diagrammatic perspective view showing an eighth step of assembling the FIG. 1 casting tree.

After all of the patterns 2 have been installed in a cluster around the descender 3, it is possible to verify that they are properly aligned using a gauge 19, as shown in FIG. 12. Once this alignment has been verified, the distributor 6 can be blocked in position by adhesively bonding to the descender 3, and the bottom ends of the patterns 2 can likewise be adhesively bonded to their respective supports 16 on the base 4, as shown in FIG. 13. Thereafter, the cup 7 is put into position on the distributor 6, as shown in FIG. 14, and the assembly is turned upside-down in order to dip the assembly as far as the patterns 2 in a bath of meltable material in the liquid state, as shown in FIG. 15. This meltable material presents a melting point that is lower than the melting point of the elements being dipped therein, and it may in particular be a wax in the liquid state. The liquid bath can thus be maintained at a temperature lower than the melting point of the elements that are briefly dipped therein, so as to prevent them from melting, even in part. While in the bath, the liquid material of the bath penetrates into the interstices between the dipped elements and in particular into the interstices between the outside surfaces 11a, 12a of the pegs 11, 12 and the inside surfaces 13a, 14a of the orifices 13, 14, as shown in FIG. 16. After the casting tree 1 that is being assembled has been removed from the liquid bath, some of the liquid material of the bath continues to adhere to the exposed surfaces that were dipped into the bath, where it cools down and solidifies, thereby forming a solid film 15 around the exposed surfaces and in the interstices between the elements that were dipped, including between the outside surfaces 11a, 12a of the pegs 11, 12 and the inside surfaces 13a, 14a of the corresponding orifices 13, 14, so as to consolidate each male-female connection 9, 10 between a pattern 2 and the distributor 6. The interstices between the distributor 6 and the patterns 2, the descender 3, and the cup 7 are also filled in at least in part by this film 15, thus also contributing in this way to consolidating the casting tree 1 that is being assembled. This assembly method is finalized by bonding the riser 5 under the base 4, as shown in FIG. 17 in order to obtain the casting tree 1 as shown in FIG. 1.

Figure 18:
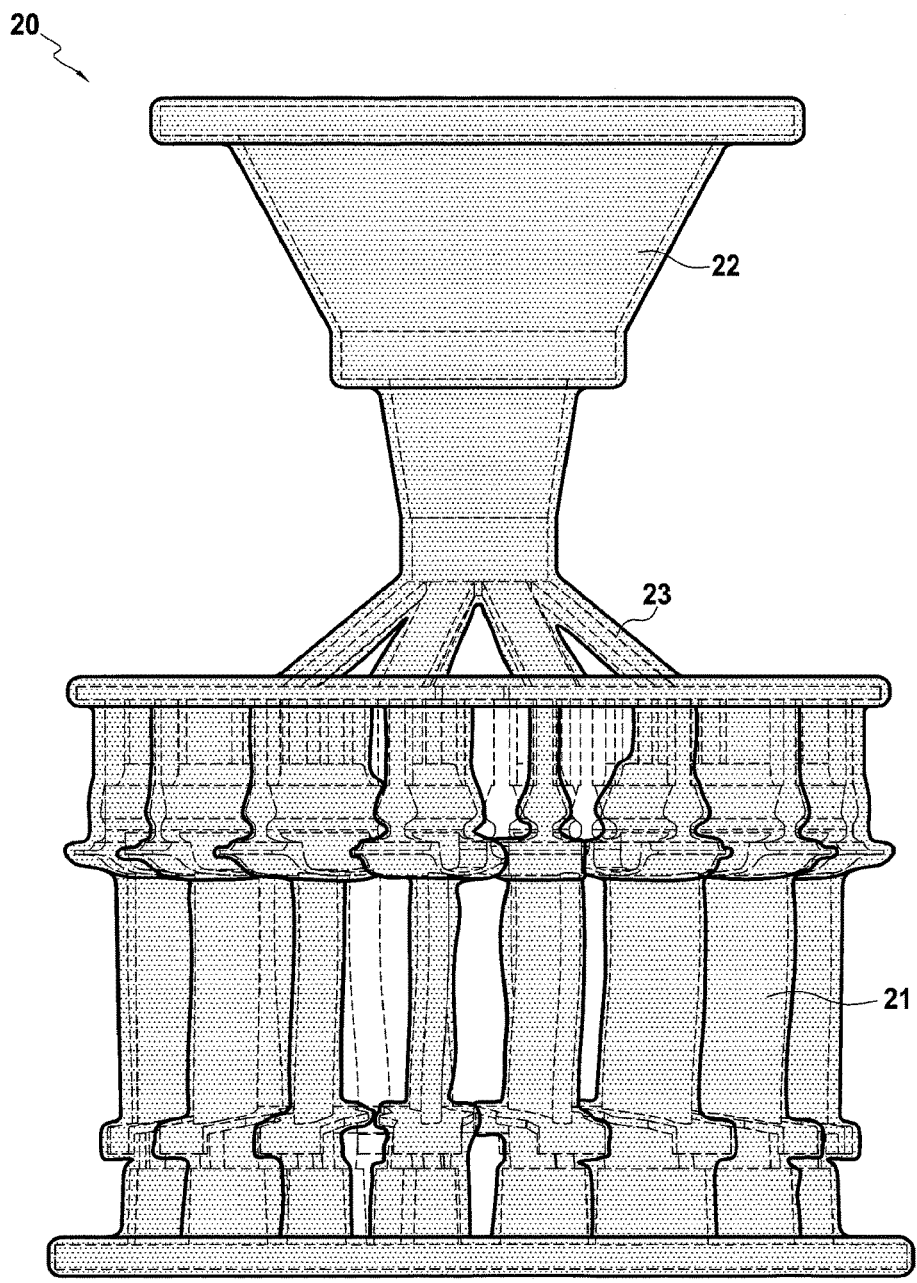
FIG. 18 shows a shell mold formed around the FIG. 1 casting tree.

This casting tree 1 can then be used for producing a shell mold 20 as shown in FIG. 18. For this purpose, a sequence comprising dipping the casting tree 1 in a slip and subsequently dusting the casting tree with refractory sand is initially repeated several times. Thereafter, the shell made of refractory and slip as formed in this way is sintered by firing in a kiln. The meltable material forming the casting tree 1 melts at the high temperatures in the kiln, and can easily be removed in the liquid state from the shell mold 20 as created in this way.

In the shell mold 20, the patterns 2 have created mold cavities 21, the cup 7 has created a casting funnel 22, and the distributor 6 has created casting channels 23 connecting the funnel 22 to the cavities 21. The mold 20 can thus be used in a casting method that comprises a step of casting a molten metal material into the inside of the mold 20, in which step the molten metal material fills the cavities 21 via the funnel 22 and the channels 23, followed by a step of causing the metal material in the mold 20 to solidify, which solidification may be directed, e.g. for the purpose of obtaining monocrystalline parts. Finally, the naturally friable mold 20 can be removed in order to release the parts that have been formed in this way within the mold cavity 21, which parts then reproduce the shape of the patterns 2.

Although the present invention is described with reference to specific embodiments, it is clear that various modifications and changes may be made to those embodiments without going beyond the general ambit of the invention as defined by the claims. In addition, individual characteristics of the various embodiments mentioned may be combined in additional embodiments. Consequently, the description and the drawings should be considered in a sense that is illustrative rather than restrictive.

The invention claimed is:

1. A casting tree for lost pattern casting, the casting tree comprising:
   at least one part support;
   at least one pattern; and
   at least one first male-female connection connecting said at least one pattern to the at least one part support, said at least one first male-female connection comprising an orifice, a peg at least partially inserted inside the orifice, and a film of meltable material interposed at least between an outside surface of the peg and an inside surface of the orifice,
   wherein said at least one first male-female connection presents at least two points of direct contact between an outside surface of the peg and an inside surface of the orifice, which points are mutually offset in at least one direction that is substantially orthogonal to an insertion axis for inserting the peg into the orifice.

2. The casting tree according to claim 1, wherein at least one of said contact points is formed by a protuberance that is radial relative to said insertion axis on at least one of the outside surface of the peg or the inside surface of the orifice.

3. The casting tree according to claim 1, further comprising a second male-female connection connecting said at least one pattern to the at least one part support and also comprising an orifice and a peg at least partially inserted inside the orifice with a film of meltable material interposed between an outside surface of the peg and an inside surface of the orifice, said at least one first male-female connection and said second male-female connection presenting insertion axes for inserting the pegs into the respective orifices that are substantially parallel and that are offset from each other in a direction orthogonal to said insertion axes.

4. The casting tree according to claim 3, wherein said at least one first male-female connection presents at least two direct contact points between the outside surface of the peg and the inside surface of the orifice, which direct contact points are mutually offset in at least a first direction that is substantially orthogonal to the insertion axes for inserting the pegs into the orifices, and said second male-female connection presents at least one direct contact point between the outside surface of the peg and the inside surface of the orifice, said contact points of the second male-female connection being offset relative to said contact points of the at least one first male-female connection at least in a second direction that is substantially orthogonal to the first direction and to the insertion axes for inserting the pegs into the orifices.

5. The casting tree according to claim 3, wherein said at least one first male-female connection presents at least three direct contact points between the outside surface of the peg and the inside surface of the orifice, and said second male-female connection presents two direct contact points between the outside surface of the peg and the inside surface of the orifice, said two contact points of the second male-female connection being mutually offset in at least one direction that is substantially orthogonal to a plane containing said insertion axes.

6. The casting tree according to claim 1, including another connection of the at least one pattern to the at least one part support opposite from the at least one first male-female connection in the direction of an insertion axis for inserting the peg in the orifice of said at least one first male-female connection.

7. The casting tree according to claim 1, wherein said at least one part support comprises a distributor for forming at least one casting channel in a mold, said at least one first male-female connection connecting said at least one pattern to said distributor.

8. The casting tree according to claim 1, having a plurality of patterns connected in a cluster to the at least one part support.

9. The method of assembling a casting tree for lost pattern casting, the method comprising:
   at least partially inserting at least one peg in at least one corresponding orifice so as to create at least one first male-female connection between at least one pattern and a part support, said at least one first male-female connection presenting at least two direct contact points between an outside surface of the at least one peg and an inside surface of the at least one corresponding orifice, the contact points being mutually offset in at least one direction substantially orthogonal to an insertion axis for inserting at least one peg into the at least one corresponding orifice;
   infiltrating a meltable material in a liquid state between the outside surface of said at least one peg and the inside surface of said at least one corresponding orifice in the at least one first male-female connection; and
   solidifying the meltable material infiltrated between the outside surface of the at least one peg and the inside surface of the at least one corresponding orifice so as to form a film of meltable material interposed at least between the outside surface of the at least one peg and the inside surface of the at least one corresponding orifice in order to consolidate the at least one first male-female connection.

10. The method according to claim 9, wherein the infiltrating is performed by dipping the at least one first male-female connection in a bath of said meltable material in the liquid state.

11. A method of producing a casting mold comprising:
   assembling a casting tree using the method of claim 9;
   coating said casting tree in a refractory material in order to form the casting mold; and
   emptying the casting tree from an inside of the casting mold.

12. The method of producing a casting mold according to claim 11, wherein said casting tree is made of a material that is meltable at a temperature lower than said refractory material and is emptied from the casting mold in a liquid state.

13. The method of producing a casting mold according to claim 11, wherein said coating is performed by dipping said casting tree in a slip, dusting the casting tree with a refractory sand in order to form a shell around the casting tree, and sintering the shell in order to consolidate the shell.

14. A casting method comprising:
   producing a casting mold using the method according to claim 11;
   casting a molten metal material into the inside of said casting mold;
   solidifying the metal material in the casting mold; and
   detaching the casting mold.

* * * * *